UNITED STATES PATENT OFFICE.

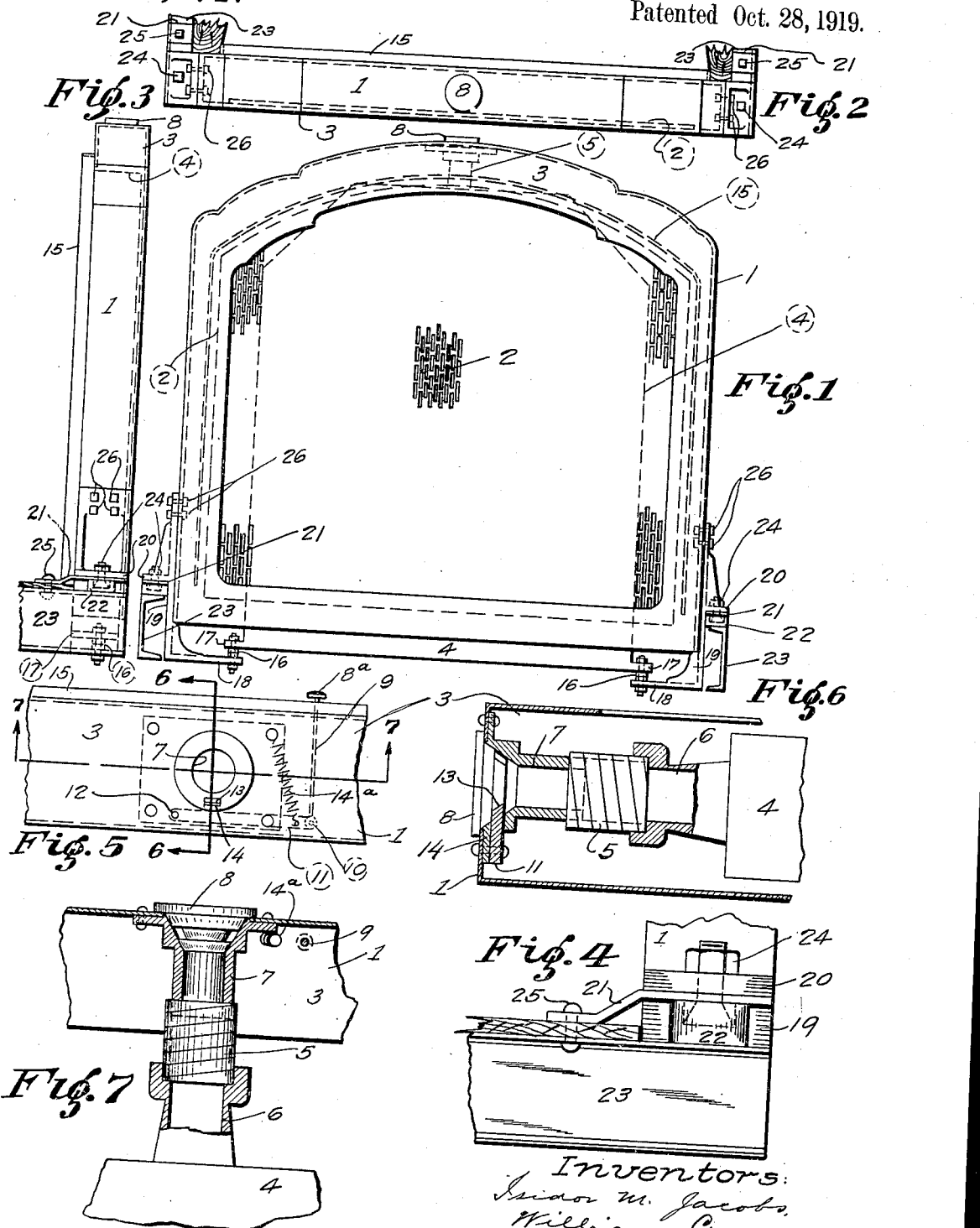

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

RADIATOR.

1,319,871.   Specification of Letters Patent.   Patented Oct. 28, 1919.

Application filed October 20, 1917. Serial No. 197,542.

*To all whom it may concern:*

Be it known that we, ISIDOR M. JACOBS and WILLIAM CRAMER, citizens of the United States, residing at Kansas City, in the county of Jackson and State of Missouri, and St. Louis, Missouri, respectively, have invented certain new and useful Improvements in Radiators, of which the following is a specification.

This invention, while it may be of general utility, is especially designed in aid of the salvaged constructions contemplated by the application for patent, Serial Number 163,652, filed Apr. 21, 1917, by one of the joint inventors herein named, and consists of what may be termed a dummy radiator adapted to cover a salvaged radiator, and means for attaching the said dummy radiator to or in connection with the salvaged radiator.

In the accompanying drawings, forming part of this specification, in which like numbers of reference denote like parts wherever they occur.

Figure 1 is a front elevation;

Fig. 2 is a top plan view;

Fig. 3 is a side elevation;

Fig. 4 is a detail attaching means;

Fig. 5 is a top plan view on an enlarged scale of the radiator opening, with the radiator plug removed;

Fig. 6 is a sectional view on the line 6—6 in Fig. 5, looking in the direction of the arrows; and Fig. 7 is a sectional view on the line 7—7 in Fig. 5, looking in the direction of the arrows.

When constructing trucks from salvaged parts of motor vehicles as described in the above-mentioned application for patent, the radiators of used cars have distinct value and the use of salvaged radiators materially decreases the cost of the truck.

A used engine embodied in a truck, tractor, or tractor truck as described in the above-mentioned application for patent, is, if in good mechanical condition, unobjectionable on account of its bearing signs of previous use; but a used radiator upon such a truck, tractor, or tractor truck would diminish its salability or sales price because of constituting a blemish to its appearance. This objection is obviated by the present invention, which provides a false front or dummy radiator 1, of standard size and appearance, large enough to inclose and hide any kind of second-hand radiator that may be purchased like the second-hand engines and motor power plants mentioned in the above-mentioned application.

This dummy radiator will be formed in the main of perforated material 2, suitable for the escape of heat from the radiator proper. The frame 3 surrounds and holds the perforated material 2 and also overlaps and incloses the frame 4 of the real radiator.

A flexible coupling 5 connects the outlet 6 from the real radiator to the outlet member 7 of the false radiator, which outlet 7 is closed by a plug 8, the opening of which is controlled by the button $8^a$ on rod 9, which is pivoted at 10 to lever 11 fulcrumed at 12 and provided with a trigger 13 over which normally is seated lip 14 on the member 7 for the retention of the plug 8 in seated position. Spring $14^a$ normally exerts force upon lever 11 to keep trigger 13 seated under lip 14.

The hood of the engine rests upon flange 15 of the real radiator and comes close to the frame 3 of the dummy radiator.

The real radiator is attached by bolts 16 through lugs 17 and through lugs 18 on brackets 19 provided with lugs 20 that rest upon springs 21 that are interposed between the said lugs 20 and solid rubber cylinders 22 that rest upon the channel beams that form the chassis 23. Bolts 24 secure lugs 20 and springs 21 together and their heads are embedded in cylinders 22, and rivets 25 secure springs 21 to the chassis 23, as shown in Fig. 3. The frame 3 of the dummy radiator is secured by bolts 26 to the brackets 19.

Having thus described this invention, we hereby reserve the benefit of all changes in form, arrangement, order, or use of parts, as it is evident that many minor changes may be made therein without departing from the spirit of this invention, or the scope of the following claims.

We claim:

1. In combination, a chassis, a main radiator, a false radiator, means for attaching the false radiator to the chassis, said means comprising a spring, a bracket superposed on said spring, said bracket having a lug, a solid block of rubber, and a headed securing member inserted through the lug on the bracket, and having its head embedded in said rubber block, said rubber block being supported upon the chassis.

2. In combination, a chassis, a main radiator, a false radiator fitted over the main radiator, a pair of brackets each comprising a lateral extension and a vertical and a horizontal extension, means for fastening the vertical extensions to the false radiator, means for fastening the main radiator to the horizontal extensions, and means for fastening the lateral extensions to the chassis including resilient cushions.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."